United States Patent
Krishnamurthy et al.

[11] Patent Number: 5,220,797
[45] Date of Patent: Jun. 22, 1993

[54] ARGON RECOVERY FROM ARGON-OXYGEN-DECARBURIZATION PROCESS WASTE GASES

[75] Inventors: Ramachandran Krishnamurthy, Piscataway; Donald L. MacLean, Annandale, both of N.J.

[73] Assignee: The BOC Group, Inc., New Providence, N.J.

[21] Appl. No.: 837,744

[22] Filed: Feb. 19, 1992

Related U.S. Application Data

[62] Division of Ser. No. 590,256, Sep. 28, 1990, Pat. No. 5,125,934.

[51] Int. Cl.$^5$ .............................................. F25J 3/00
[52] U.S. Cl. .......................................... 62/22; 62/17; 62/18; 62/24; 55/25; 55/66; 55/68
[58] Field of Search ................. 62/17, 18, 22, 24; 55/25, 66, 68

[56] References Cited

U.S. PATENT DOCUMENTS

| | | | |
|---|---|---|---|
| 4,417,909 | 11/1983 | Weltmer, Jr. | 62/22 X |
| 4,629,407 | 12/1986 | Amlinger | 425/7 |
| 4,687,498 | 4/1987 | MacLean et al. | 62/17 |
| 4,689,062 | 8/1987 | MacLean et al. | 62/22 X |
| 4,732,580 | 3/1988 | Jain et al. | 62/18 X |
| 4,750,925 | 6/1988 | MacLean et al. | 62/18 |
| 4,752,311 | 6/1988 | MacLean et al. | 62/18 |
| 4,817,392 | 4/1989 | Agrawal et al. | 62/18 |
| 4,838,912 | 6/1989 | Amlinger | 62/9 |
| 4,861,361 | 8/1989 | Jain et al. | 62/22 X |
| 5,049,174 | 9/1991 | Thorogood et al. | 62/22 X |
| 5,100,447 | 3/1992 | Krishnamurthy et al. | 62/22 |

*Primary Examiner*—Henry A. Bennet
*Assistant Examiner*—Christopher B. Kilner
*Attorney, Agent, or Firm*—Coleman R. Reap; Larry R. Cassett

[57] ABSTRACT

The present invention is directed to a method for recovering argon from a feed mixture comprising argon, carbon monoxide, carbon dioxide, nitrogen, and hydrogen which comprises the steps of (a) purifying the feed mixture to remove contaminants, (b) compressing the purified feed mixture to a separation pressure, and (c) passing the compressed purified feed mixture through a pressure swing adsorption system to separate carbon monoxide, carbon dioxide, and all or most of the nitrogen from the mixture as adsorbed products and to produce an argon-rich fraction as a non-adsorbed product. The argon-rich fraction from step (c) may be further purified by passing the fraction to a cryogenic fractional distillation system to separate hydrogen and any remaining nitrogen from the fraction as a distillate product and to produce a pure argon product. In a second and third embodiment, the invention is directed to a method for recovering argon from a feed mixture comprising argon, carbon monoxide, carbon dioxide, nitrogen, and oxygen, wherein oxygen is removed from the argon-rich fraction exiting the pressure swing adsorption system in step (c) by passing the fraction to a second pressure swing adsorption system before or after further purification of the fraction in a cryogenic fractional distillation system.

29 Claims, 5 Drawing Sheets

ARGON RECOVERY FROM ARGON-OXYGEN-DECARBURIZATION PROCESS WASTE GASES

This is a division of application Ser. No. 07/590,256, filed 28 Sep. 1990, now U.S. Pat. No. 5,125,934.

BACKGROUND OF THE INVENTION

1. Field of the Invention

The present invention is directed to a method for recovering argon from an argon-oxygen-decarburization process waste gas. More particularly, the present invention is directed to a method for recovering argon from a feed mixture comprising argon, carbon monoxide, carbon dioxide, nitrogen, and optionally hydrogen and oxygen.

2. Description of the Prior Art

The commercial preparation of argon by separation of air is well known in the art. Air separation also produces equivalent quantities of nitrogen and oxygen. Because the demand for argon has been growing at a more rapid rate than the demand for nitrogen and oxygen, there is a need for alternative sources for producing argon. One such alternative source is the argon-oxygen-decarburization process waste gas from a steel making plant.

Steel manufacturing processes employ mixtures of oxygen and argon to act as an inert shield (inerting agent) during casting and to decrease the carbon monoxide partial pressure in the argon-oxygen-decarburization (AOD) process. Because argon is expensive, is used in large amounts during steel making, and is unchanged in the AOD process, recovering the argon-rich AOD process waste gas for use in this or other processes is desirable. Conventional methods for recovering argon from AOD process waste gas have generally focused on cryogenic processes which consist of pretreating the feed mixture to remove dust and other impurities, removing carbon dioxide and water from the mixture, and cryogenically distilling the gas to separate hydrogen, nitrogen, and carbon monoxide as distillate products and argon as the bottoms product in the cryogenic column.

A dedicated air separation plant, which has an argon purification unit, is generally employed to provide oxygen and argon to the steel mill for the AOD process and nitrogen as an inerting agent. An air separation plant typically consists of a double column (upper and lower) for separating air into oxygen and nitrogen products. Air is introduced into the bottom of the lower column which operates at a pressure of approximately 90 psia. The gaseous nitrogen product is typically withdrawn as a distillate product from the upper column which operates at low pressure, for example, at about 18 psia. A pure liquid nitrogen stream distillate product from the lower column is subcooled by expansion and used to provide reflux for the upper column. The oxygen product is withdrawn as a bottoms product, from the bottom of the upper column. An oxygen-rich stream is withdrawn as a bottoms product, from the bottom of the lower column, and admitted as feed gas to the upper column for further processing. An argon-rich stream typically containing about 10% to 12% argon admixed with a small amount of nitrogen and a significant amount of oxygen is withdrawn from the upper column at a location intermediate between the feed inlet to the column and the oxygen product outlet. This argon-rich stream is processed in a crude argon column which removes most of the oxygen to provide a 98% crude argon product. The oxygen-rich product from the crude argon column is recycled to the upper column. The 98% crude argon product can be further purified by removing oxygen by catalytic oxidation after addition of hydrogen, drying to remove the water formed in the catalytic oxidation unit, and purifying to remove the residual nitrogen in a cryogenic separation column.

Argon recovery methods are disclosed in more detail in "Cryogenic Processes and Equipment 1982", AIChE Symposium Series, No. 224, vol. 79, p. 12, Helmut Springmann, "Methods for Argon Recovery to Meet Increased Demand on the Argon Market", which disclosure is incorporated herein by reference.

U.S. Pat. Nos. 4,687,498, 4,750,925, and 4,752,311, issued to MacLean et al., disclose the recovery of argon from ammonia plant purge gases which contain hydrogen, nitrogen, methane, and argon. The methods comprise removing methane and nitrogen from the purge gas mixture by pressure swing adsorption, then removing hydrogen, and finally cryogenically distilling the mixture to remove remaining amounts of nitrogen and hydrogen thereby preparing a pure argon product.

In a pressure swing adsorption system (PSA), a gaseous mixture is passed at an elevated pressure through a bed of an adsorbent material which selectively adsorbs one or more of the components of the gaseous mixture. Product gas, enriched in the unadsorbed gaseous component(s), is then withdrawn from the bed.

The term "gaseous mixture", as used herein, refers to a gaseous mixture, such as air, primarily comprised of two or more components having different molecular size. The term "enriched gas" refers to a gas comprised of the component(s) of the gaseous mixture relatively unadsorbed after passage of the gaseous mixture through the adsorbent bed. The enriched gas generally must meet a predetermined purity level, for example, from about 90% to about 99%, in the unadsorbed component(s). The term "lean gas" refers to a gas exiting from the adsorption bed that fails to meet the predetermined purity level set for the enriched gas. When the strongly adsorbed component is the desired product, a cocurrent depressurization step and a cocurrent purge step of the strongly adsorbed component are added to the process.

The term "adsorption bed" refers either to a single bed or a serial arrangement of two beds. The inlet end of a single bed system is the inlet end of the single bed while the inlet end of the two bed system (arranged in series) is the inlet end of the first bed in the system. The outlet end of a single bed system is the outlet end of the single bed and the outlet end of the two bed system (arranged in series) is the outlet end of the second bed in the system. By using two adsorption beds in parallel in a system and by cycling (alternating) between the adsorption beds, product gas can be obtained continuously.

As a gaseous mixture travels through a bed of adsorbent, the adsorbable gaseous components of the mixture enter and fill the pores of the adsorbent. After a period of time, the composition of the gas exiting the bed of adsorbent is essentially the same as the composition entering the bed. This period of time is known as the breakthrough point. At some time prior to this breakthrough point, the adsorbent bed must be regenerated. Regeneration involves stopping the flow of gaseous mixture through the bed and purging the bed of the adsorbed components generally by venting the bed to atmospheric or subatmospheric pressure.

A pressure swing adsorption system generally employs two adsorbent beds operated on cycles which are sequenced to be out of phase with one another by 180° so that when one bed is in the adsorption or production step, the other bed is in the regeneration step. The two adsorption beds may be connected in series or in parallel. In a serial arrangement, the gas exiting the outlet end of the first bed enters the inlet end of the second bed. In a parallel arrangement, the gaseous mixture enters the inlet end of all beds comprising the system. Generally, a serial arrangement of beds is preferred for obtaining a high purity gas product and a parallel arrangement of beds is preferred for purifying a large quantity of a gaseous mixture in a short time cycle.

Between the adsorption step and the regeneration step, the pressure in the two adsorption beds is generally equalized by connecting the inlet ends of the two beds together and the outlet ends of the two beds together. During the pressure equalization step, the gas within the pores of the adsorption bed which has just completed its adsorption step (under high pressure) flows into the adsorption bed which has just completed its regeneration step (under low pressure) because of the pressure differential which exists between the two beds. The adsorption bed which completed its adsorption step is depressurized and the adsorption bed which completed its regeneration step is repressurized. This pressure equalization step improves the yield of the product gas because the gas within the pores of the bed which has just completed its adsorption step has already been enriched. When more than two beds are employed in the adsorption system, it is common to have a number of pressure equalizations steps.

Gas separation by the pressure swing adsorption method is more fully described in, for example, "Gas Separation by Adsorption Processes", Ralph T. Yang, Ed., Chapter 7, "Pressure Swing Adsorption: Principles and Processes" Butterworth 1987, and in U.S. Pat. Nos. 2,944,627, 3,801,513, and 3,960,522, which disclosures are incorporated by reference herein. Modifications and improvements in the pressure swing adsorption process and apparatus are described in detail in, for example, U.S. Pat. Nos. 4,415,340 and 4,340,398, which disclosures are incorporated by reference herein.

While the above methods provide processes for recovering argon from waste gases, none of the methods disclose a satisfactory process for recovering argon from an argon-oxygen-decarburization process waste gas. Cryogenic separation processes tend to have a high capital cost especially when more than one pure product is required. Argon sources which contain a high concentration of argon (higher than 6%) are particularly attractive sources because of the high value of argon and because such sources provide an opportunity for cost-effective argon recovery. The present invention provides an improved method for recovering argon from argon-rich process waste gases such as AOD process waste gases which employs a combination of non-cryogenic and cryogenic separating steps. The present invention also provides a novel pressure swing adsorption method to remove carbon monoxide, carbon dioxide, and all or most of the nitrogen from argon in the process waste gas exiting a steel manufacturing plant.

SUMMARY OF THE INVENTION

The present invention is directed to a method for recovering argon from a feed mixture comprising argon, carbon monoxide, carbon dioxide, nitrogen, and hydrogen which comprises the steps of (a) purifying the feed mixture to remove contaminants, (b) compressing the purified feed mixture to a separation pressure, and (c) passing the compressed purified feed mixture through a pressure swing adsorption system to separate carbon monoxide, carbon dioxide, and all or most of the nitrogen from the mixture as adsorbed products and to produce an argon-rich fraction as a non-adsorbed product. The argon-rich fraction from step (c) may be further purified by passing the fraction to a cryogenic fractional distillation system to separate hydrogen and any remaining nitrogen from the fraction as a distillate product and to produce a pure argon product.

In a second embodiment, the invention is directed to a method for recovering argon from a feed mixture comprising argon, carbon monoxide, carbon dioxide, nitrogen, oxygen which comprises the steps of (a) purifying the feed mixture to remove contaminants, (b) compressing the purified feed mixture to a separation pressure, (c) passing the compressed purified feed mixture through a first pressure swing adsorption system to separate carbon monoxide, carbon dioxide, and all or most of the nitrogen from the mixture as adsorbed products and to produce a first argon-rich fraction as a non-adsorbed product, (d) passing the first argon-rich fraction from step (c) to a second pressure swing adsorption system to separate oxygen as an adsorbed product and to produce a second argon-rich fraction as a non-adsorbed product, and (e) passing the second argon-rich fraction from step (d) to a cryogenic fractional distillation system to separate any remaining nitrogen from the fraction as a distillate product and to produce a pure argon product.

In a third embodiment, the invention is directed to a method for recovering argon from a feed mixture comprising argon, carbon monoxide, carbon dioxide, nitrogen, and oxygen, which comprises the steps of (a) purifying the feed mixture to remove contaminants, (b) compressing the purified feed mixture to a separation pressure, (c) passing the compressed purified feed mixture through a first pressure swing adsorption system to separate carbon monoxide, carbon dioxide, and all or most of the nitrogen from the mixture as adsorbed products and to produce a first argon-rich fraction as a non-adsorbed product, (d) passing the first argon-rich fraction from step (c) to a cryogenic fractional distillation system to separate any remaining nitrogen from the fraction as a distillate product and to produce a second argon-rich fraction, and (e) passing the second argon-rich fraction from step (d) to a second pressure swing adsorption system to separate oxygen as an adsorbed product and pure argon as a non-adsorbed product.

DETAILED DESCRIPTION OF THE INVENTION

Figure 1:
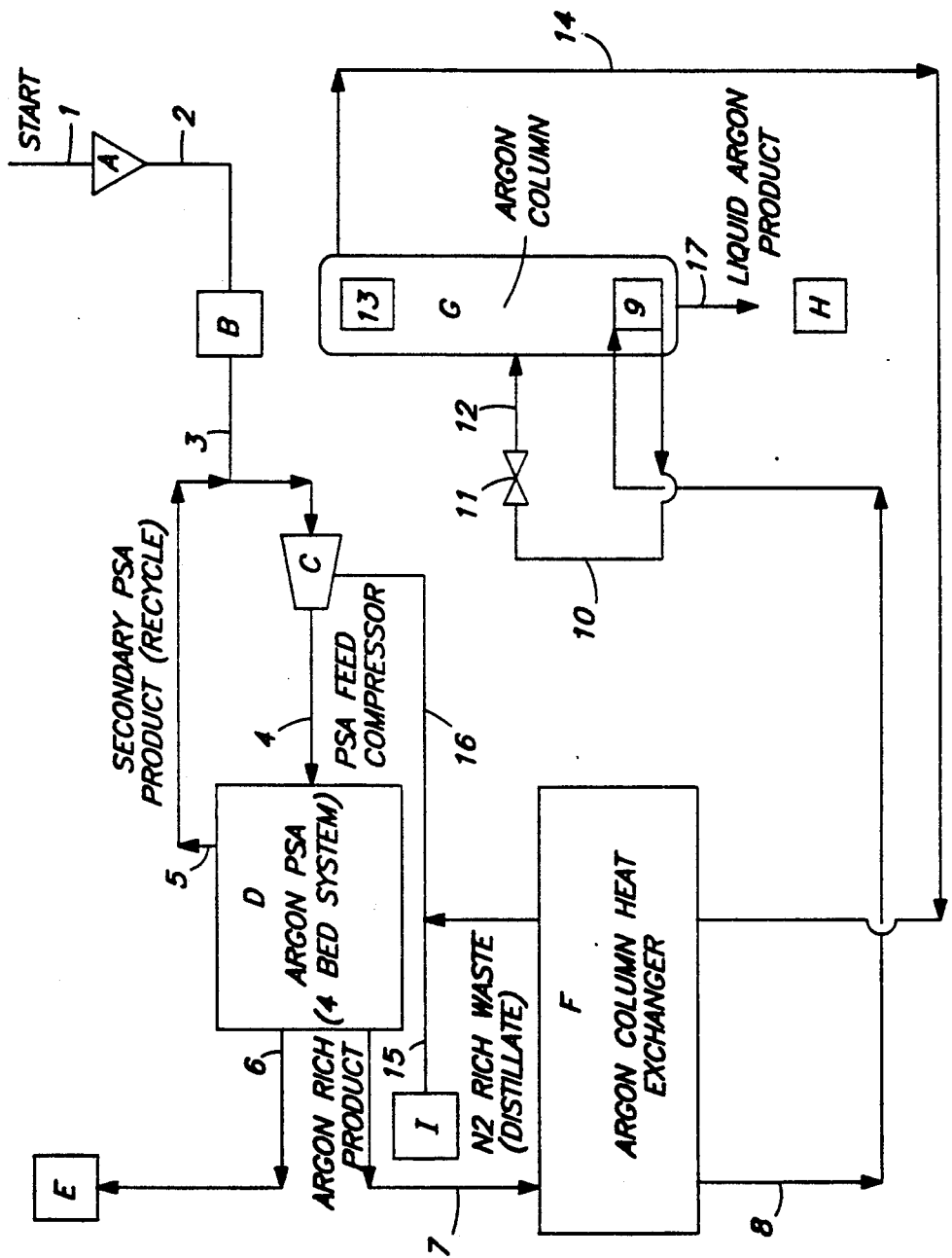
FIG. 1 is a schematic process flow diagram illustrating a first embodiment of the present invention which utilizes a pressure swing adsorption system and optionally a cryogenic fractional distillation system to recover argon from a feed mixture comprising argon, carbon monoxide, carbon dioxide, nitrogen, and hydrogen.

Applicants have discovered a method for recovering argon from an argon-oxygen-decarburization process waste gas which contains argon, carbon monoxide, carbon dioxide, nitrogen, and optionally hydrogen and oxygen. A combination of non-cryogenic and cryogenic separation steps are utilized which efficiently and economically yields enriched argon in high purity. The preferred non-cryogenic step comprises a pressure swing adsorption system which provides the critical separation of carbon monoxide, carbon dioxide, and all or most of the nitrogen from argon.

In a preferred first embodiment, the method may be employed to recover argon from a feed mixture comprising argon, carbon monoxide, carbon dioxide, nitrogen, and hydrogen. Carbon monoxide, carbon dioxide, and all or most of the nitrogen are removed from the feed mixture by pressure swing adsorption as adsorbed products and an argon-rich fraction is produced as a non-adsorbed product. The argon-rich fraction may be used directly or may be further purified in a cryogenic fractional distillation system to remove hydrogen and any remaining nitrogen from the mixture to produce a pure merchant grade argon product.

In a second embodiment, the method may be employed to recover argon from a feed mixture comprising argon, carbon monoxide, carbon dioxide, nitrogen, and oxygen. Carbon monoxide, carbon dioxide, and all or most of the nitrogen are removed from the feed mixture by a first pressure swing adsorption to separate carbon monoxide, carbon dioxide, and all or most of the nitrogen from the mixture as adsorbed products and a first argon-rich fraction is produced as a non-adsorbed product. Oxygen is then removed from the first argon-rich fraction by a second pressure swing adsorption to separate oxygen as an adsorbed product and to produce a second argon-rich fraction as a non-adsorbed product. The second argon-rich fraction is then purified in a cryogenic fractional distillation system to remove any remaining nitrogen in the mixture to produce a pure argon product. Alternatively, the second pressure swing adsorption separation step to remove oxygen as an adsorbed product may be carried out before the first pressure swing adsorption separation to remove carbon monoxide, carbon dioxide, and all or most of the nitrogen from the mixture as adsorbed products.

In a third embodiment, argon is recovered from a feed mixture comprising argon, carbon monoxide, carbon dioxide, nitrogen, and oxygen, by first removing carbon monoxide, carbon dioxide, and all or most of the nitrogen from the feed mixture by a first pressure swing adsorption to separate carbon monoxide, carbon dioxide, and all or most of the nitrogen from the mixture as adsorbed products and to produce a first argon-rich fraction as a non-adsorbed product. The first argon-rich fraction is then passed to a cryogenic fractional distillation system to separate any remaining nitrogen from the fraction as a distillate product and to produce a second argon-rich fraction. The second argon-rich fraction is then passed to a second pressure swing adsorption system to separate oxygen as an adsorbed product and pure argon as a non-adsorbed product.

In alternative embodiments, the feed mixtures in the above embodiments may be passed to a carbon dioxide separation means prior to passing the feed mixture to the first pressure swing adsorption which separates carbon monoxide, carbon dioxide, and all or most of the nitrogen from the mixture as adsorbed products and a first argon-rich fraction as a non-adsorbed product. The carbon dioxide separation means may be a carbon dioxide absorption column or a pressure swing adsorption system, and is preferably a pressure swing adsorption system.

The feed mixture (waste gas, process waste gas, feed gas, off-gas) in the present invention is an argon-rich process waste gas from an argon-oxygen-decarburization (AOD) process in a steel manufacturing plant. Because of the intermittent operation of the AOD process, the feed mixture is collected as an unsteady, dust-laden waste stream mixture. The feed mixture is first washed with water to cool and remove dust from the gas, then collected into one of two gas receivers to concentrate argon in one receiver and carbon monoxide in the other receiver. Additional dust removal, if required, can be carried out by electrostatic separation. The gas receivers are sized so that a steady gas stream and composition can be obtained. The gas recovery system can be operated so that the AOD process waste gases are collected without addition of oxygen from the atmosphere to the gas exiting the AOD vessel (suppressed combustion mode) or with addition of oxygen from the atmosphere (full combustion mode). Typical composition ranges for feed mixtures in the suppressed combustion mode and the full combustion mode are set out below.

| Gas | Suppressed Combustion (% by Volume) | Full Combustion (% by Volume) |
| --- | --- | --- |
| Argon | 10–75 | 10–40 |
| Carbon Monoxide | 10–60 | 0–40 |
| Carbon Dioxide | 0–40 | 10–40 |
| Nitrogen | 0–40 | 20–40 |
| Oxygen | 0–1 | 1–20 |
| Hydrogen | 0–3 | — |

In a preferred first embodiment, the feed mixture is collected from an AOD gas stream in the suppressed combustion mode and comprises argon in an amount greater than about 10%, carbon monoxide in an amount up to about 60%, carbon dioxide in an amount up to about 40%, nitrogen in an amount up to about 40%, and hydrogen in an amount up to about 3%. In a second and third embodiment, the feed mixture is collected from an AOD gas stream in the full combustion mode and comprises argon in an amount greater than about 10%, carbon monoxide in an amount up to about 40%, carbon dioxide in an amount up to about 40%, nitrogen in an amount up to about 40%, and oxygen in an amount up to about 20%.

The method of the present invention may also be used for recovering argon from gas mixtures outside this composition range. For example, feed mixtures containing greater than 3% argon may also be employed in the present invention. Furthermore, feed mixtures containing up to about 5% methane may also be used since methane will be removed in the first pressure swing adsorption system. Typically the feed mixture is available at pressures slightly above atmospheric and will need to be compressed prior to purification and separation. The feed mixture is generally available at ambient temperature. If the feed mixture is available at a higher than ambient temperature, the feed mixture is cooled in a heat-exchanger before the mixture is passed to the pressure swing adsorption system.

In addition to the gaseous components set out above, the feed mixture may also contain trace amounts of contaminants such as carbonyl sulfide (less than about 10 ppm), hydrogen sulfide (less than about 10 ppm), nitric oxide (less than about 10 ppm), ammonia (less than about 1 ppm), and hydrogen cyanide (less than about 0.5 ppm). In the suppressed combustion mode, the feed mixture typically contains only between about 50 ppm and about 1000 ppm oxygen. These contaminants are removed before the non-cryogenic separation in a purification step. For example, the feed mixture can be purified to remove ammonia, hydrogen cyanide, and hydrogen sulfide by treating the feed mixture with a water scrubber and an alkali scrubber. Nitric oxide can be removed by treating the feed mixture with a potassium permangante scrubber, carbonyl sulfide and hydrogen sulfide cam be removed by passing the feed mixture through a bed of impregnated activated carbon and a bed of zinc oxide, and oxygen can be removed by passing the feed mixture through a catalytic oxidation unit. Nitric oxide can also be removed by selective catalytic reduction using ammonia and carbonyl sulfide may be catalytically hydrolyzed to hydrogen sulfide before alkali scrubbing. Alternatively, if the desired argon product can tolerate oxygen in the range from about 100 ppm to about 200 ppm (suppressed combustion mode), the catalytic removal of oxygen may not be necessary. If the pretreatment steps require higher temperature operation, for example, the zinc oxide treatment, the feed mixture can be heated to the desired temperature using waste heat from the steel plant or electric heaters. The feed mixture is subsequently subcooled to ambient temperature prior to the next purification treatment. The water content in the feed mixture, after the purification step, may be removed in the first pressure swing adsorption stage along with carbon dioxide, carbon monoxide, and nitrogen, or in a separate step by passing the feed mixture through a dryer.

The pressure swing adsorption system in the present invention operates in a sequence to completely separate carbon monoxide and carbon dioxide and completely or partially separate the nitrogen in the feed mixture. In the preferred first embodiment (suppressed combustion mode), the argon-rich feed mixture will have a purity, after purification by pressure swing adsorption, of greater than about 95% and will contain less than about 1 ppm of carbon monoxide and carbon dioxide. The remaining component will be nitrogen. The nitrogen content can be reduced to as low as under about 100 ppm if desired. Argon yield will be reduced if high nitrogen removal is required. This argon-rich fraction (suppressed combustion mode), after pressure swing adsorption purification, may be used directly as a useful product or, alternatively, may be further purified in a cryogenic fractional distillation system to remove hydrogen and any remaining nitrogen from the mixture as a distillate product and produce a pure merchant grade argon product. This argon product (suppressed combustion mode), after purification by pressure swing adsorption and cryogenic fractional distillation, will have a purity of greater than about 99%.

In the second and third embodiments (full combustion mode), the argon feed mixture is purified by a first pressure swing adsorption to completely separate carbon monoxide and carbon dioxide and completely or partially separate the nitrogen and to produce an argon-rich fraction. Oxygen is then separated from the argon-rich fraction in a second pressure swing adsorption either before or after further purification by cryogenic fractional distillation to remove any remaining nitrogen from the mixture to produce a pure merchant grade argon product. This argon product (full combustion mode), after purification by two pressure swing adsorption separations and cryogenic fractional distillation, will have a purity of greater than about 99%.

Several different pressure swing adsorption cycle sequences may be employed in the present method. The selection of the exact sequence will depend upon the purity and yield of argon desired. In general, the yield of argon may vary from about 50% to about 95%. The selection of the exact sequence will also depend upon economic restrictions on the pressure swing adsorption system. A simple pressure swing adsorption sequence will consist of a production step (feed mixture adsorption and argon-rich product release), a pressure equalization step between two adsorption beds for a first level depressurization, a second level depressurization step from the feed end of the producing bed, a regeneration step under vacuum to remove impurities adsorbed on the adsorption bed, a pressure equalization step between two adsorption beds for a first level repressurization, and a backfill step of product gas, feed mixture gas, or a combination of the two, for a second level repressurization. More complex pressure swing adsorption sequences which provide higher yields of argon include removal of secondary product gas from an intermediate location in the adsorption bed and recycle of the gas to the pressure swing adsorption system, and displacement of argon-rich gas into the secondary product gas by compressing and introducing a portion of the impurity rich gases collected during the depressurization step and the vacuum desorption regeneration step in a co-current direction.

The non-cryogenic pressure swing adsorption separation method of the present invention provides significant savings in capital and operating expense over completely cryogenic methods.

The argon-rich product from the pressure swing adsorption system in the first embodiment may be recycled with the product gas from the crude argon column in the air separation unit supplying argon and oxygen to the steel plant. The argon-rich product from the zeolite (first) pressure swing adsorption system in the second embodiment may be recycled with the feed mixture to the crude argon column. The argon-rich product from the carbon molecular sieve (second) pressure swing adsorption system in the second embodiment may be recycled with the product from the crude argon column. The argon-rich product from the cryogenic separation column in the second embodiment may be recycled to the feed gas entering the crude argon column. The steps in the present method may be also modified to separate the feed gas into an argon-rich product, a carbon monoxide-rich product, and a carbon dioxide-rich product. The carbon monoxide-rich fraction may be further purified to yield merchant grade (98+%) carbon monoxide.

The cryogenic fractional distillation system consists of a distillation column to separate nitrogen and argon at a temperature below about $-250°$ F., heat exchangers to cool the feed mixture to cryogenic column temperature and warm the process waste gases from cryogenic column temperature to ambient temperature, and a nitrogen refrigeration loop to generate the refrigeration required for separation and liquefaction of the gases. The cryogenic fractional distillation system may also be integrated into an existing cryogenic air separation system in the steel manufacturing plant which supplies oxygen to the steel plant and purifies argon.

The method for producing argon from a feed mixture comprising argon, carbon monoxide, carbon dioxide, nitrogen, and optionally hydrogen and oxygen, can be better understood by reference to the FIGURES in which like numerals refer to like parts of the invention throughout the FIGURES. Although the present invention is described and illustrated in connection with preferred embodiments, applicants intend that modifications and variations may be used without departing from the spirit of the present invention.

FIG. 1 illustrates a preferred first embodiment of the present invention for recovering argon from a feed mixture comprising AOD process waste gases in a suppressed combustion mode. The feed mixture comprises argon, carbon monoxide, carbon dioxide, nitrogen, and hydrogen and is separated by a combination of non-cryogenic and cryogenic means. In FIG. 1, feed mixture is fed through feed conduit 1 to purification compressor A (or blower) to compress the feed mixture to the purification pressure. The purification pressure must be sufficiently high to support the pressure drop in the subsequent purification steps. In general, the purification pressure is in the range from about 20 psia to about 50 psia, preferably from about 20 psia to about 35 psia, and more preferably about 20 psia. The compressed feed mixture is fed through feed conduit 2 to purification unit B to purify the feed mixture by passing the mixture through appropriate scrubbers or catalytic units, as set out above.

The feed mixture is then fed through feed conduit 3 to separation compressor C to compress the feed mixture to the separation pressure. The separation pressure must be sufficiently high to support the pressure drop in the subsequent separation steps and must be able to provide the operating pressure differential in the pressure swing adsorption system. In general, the separation pressure is in the range from about 25 psia to about 350 psia, preferably from about 40 psia to about 200 psia, and more preferably about 40 psia to about 100 psia. The feed mixture is then passed into argon pressure swing adsorption system D through feed conduit 4 to separate the mixture. The temperature of the feed mixture entering the pressure swing adsorption system will be ambient.

During the production step, the feed mixture is separated in argon pressure swing adsorption system D to remove carbon monoxide, carbon dioxide, and all or most of the nitrogen and to produce an argon-rich fraction. An argon-rich fraction is withdrawn from argon pressure swing adsorption system D which may be used directly or optionally may be fed through feed conduit 7 for further purification in argon cryogenic fractional distillation column G.

During the regeneration step, a carbon monoxide, carbon dioxide, and nitrogen-rich fraction is withdrawn from argon pressure swing adsorption system D via feed conduit 6 and passed to carbon monoxide, carbon dioxide, and nitrogen product reservoir E. The carbon monoxide, carbon dioxide, and nitrogen-rich fraction may be recycled to an appropriate location in the plant depending upon the relative amounts of the various components for use as fuel or inert gas, or may be further purified to prepare merchant grade carbon monoxide or carbon dioxide.

During the intermediate depressurization step, vent gas (secondary product gas) is collected from pressure swing adsorption system D and recycled through feed conduit 5. The secondary product gas is then mixed with fresh feed mixture in feed conduit 3 and compressed in compressor C to the operating pressure for recycling to pressure swing adsorption system D.

When the argon-rich fraction is further purified by cryogenic fractional distillation, the argon-rich fraction from argon pressure swing adsorption system D is fed through feed conduit 7 to argon column heat exchanger F where the feed mixture is cooled to close to its liquefaction point (with refrigeration derived from the outgoing recycle gas stream). The cooled argon-rich fraction may be optionally expanded, such as in a turbine expander, for further cooling. Cooled argon gas from heat exchanger F is fed through feed conduit 8 to reboiler 9 in argon cryogenic fractional distillation column G for further cooling. Partially liquified argon in reboiler 9 accepts refrigeration from reboiler 9. After being substantially liquified, the argon from reboiler 9 passes to argon cryogenic fractional distillation column G via feed conduit 10, expansion valve 11, and feed conduit 12.

Nitrogen not removed in the pressure swing adsorption system, and any hydrogen, in the feed mixture are then cryogenically fractionally distilled from argon in cryogenic fractional distillation column G. The nitrogen and hydrogen-rich fraction is removed from distillation column condenser 13 at the top of argon cryogenic fractional distillation column G as a distillate stream. The nitrogen and hydrogen-rich fraction is passed through feed conduit 14 to argon column heat exchanger F where the nitrogen-rich gas is brought to ambient temperature. Refrigeration from the nitrogen-rich gas is passed to heat exchanger F for cooling argon feed mixture from argon pressure swing adsorption system D. Warmed nitrogen-rich gas is then passed from heat exchanger F through feed conduit 15 to nitrogen reservoir I. Alternatively, the nitrogen-rich fraction may be recycled to argon pressure swing adsorption system D by passing the distillate stream from heat exchanger F through feed conduit 16 to feed compressor C. Compressor C compresses the recycle gas which is passed through feed conduit 4 to argon pressure swing adsorption system D. This option is viable only if there is no hydrogen in the feed mixture. The nitrogen-rich fraction may also be used as a purge gas in the pressure swing adsorption system.

After distillation of nitrogen and any hydrogen from the feed mixture in cryogenic fractional distillation column G, pure argon product is withdrawn from the bottom of distillation column G and passed to argon product reservoir H via feed conduit 17. Any oxygen not removed by catalytic oxidation during the purification step will be separated with argon product.

Figure 2:
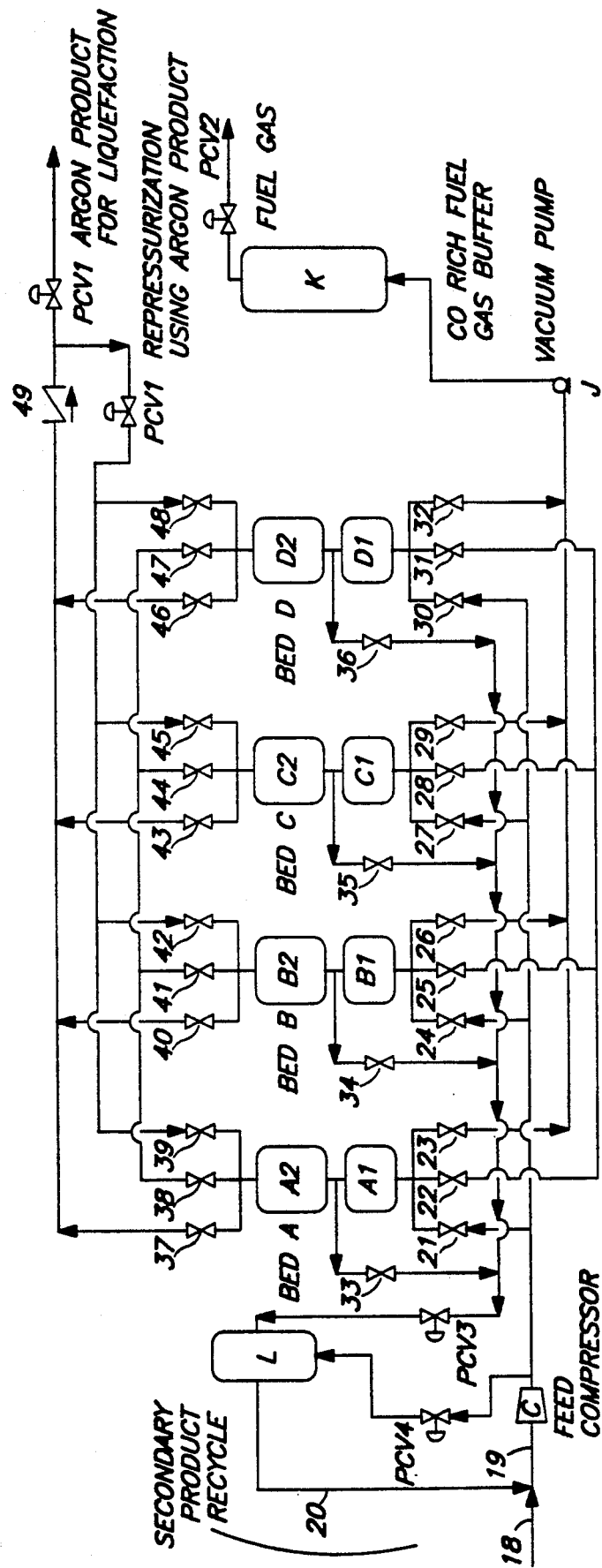
FIG. 2 is a schematic process flow diagram illustrating a pressure swing adsorption method for separating carbon monoxide, carbon dioxide, and all or most of the nitrogen from argon in a feed mixture according to the present invention.

FIG. 2 illustrates a pressure swing adsorption method for separating carbon monoxide, carbon dioxide and all or most of the nitrogen from a feed mixture to produce an argon-rich fraction according to the present invention. As set out in FIG. 1, the feed mixture from purification unit B is passed to argon pressure swing adsorption feed compressor C. Compressor C compresses the feed mixture to the separation pressure and feeds the mixture at ambient temperature via feed conduit 4 to argon pressure swing adsorption system D (see FIG. 1).

In FIG. 2, argon pressure swing adsorption system comprises adsorption beds A1, A2, B1, B2, C1, D1, and D2, vacuum pump J, carbon dioxide-carbon monoxide-rich fuel gas buffer vessel K, secondary product surge tank L, argon product pressure control valve PCV1, carbon monoxide-rich fuel gas pressure control valve PCV2, secondary product pressure control valve PCV3, feed compressor discharge pressure control valve PCV4, repressurization flow control valve FCV1, stop valves 21 through 48, and non-return valve 49.

Each of the adsorption beds, A through D, is physically divided into two bed parts, A1/A2, B1/B2, C1/C2, and D1/D2, respectively, to facilitate removal of a secondary product recycle stream from an intermediate position in the bed. The secondary product recycle stream is drawn at an intermediate pressure, for example at about 25 psia, and passed to secondary product surge tank L. The secondary product stream is then passed through feed conduit 20 to feed conduits 18 and 19 to be mixed with fresh feed mixture, compressed to pressure swing adsorption operating pressure in compressor C, and passed to the pressure swing adsorption system. The pressure swing adsorption system is operated in accordance with the full cycle sequence shown in Table 1. The sequence is described below in detail using beds A1/A2. Beds B1/B2, C1/C2, and D1/D2 are employed in the same sequence but at an offset as shown in Table 1.

TABLE 1

Four Bed Argon Pressure Swing Adsorption Cycle Sequence

| Step No. | Bed A | Bed B | Bed C | Bed D | Valves Open |
|---|---|---|---|---|---|
| 1 | Feed gas Product gas | Eq. Press. (repress.) | Vacuum Regenerate | Eq. Press. (depress.) | 21, 25, 29, 31 37, 41, 47 |
| 2 | Feed gas Product gas | Repressurize Product gas | Vacuum Regenerate | Intermediate Depressurize | 21, 29, 36, 37 42 |
| 3 | Eq. Press. (depress.) | Feed gas Product gas | Eq. Press. (repress.) | Vacuum Regenerate | 22, 24, 28, 32 38, 40, 44 |
| 4 | Intermediate Depressurize | Feed gas Product gas | Repressurize Product gas | Vacuum Regenerate | 24, 32, 33, 40 45 |
| 5 | Vacuum Regenerate | Eq. Press. (depress.) | Feed gas Product gas | Eq. Press. (repress.) | 23, 25, 27, 31 41, 43, 47 |
| 6 | Vacuum Regenerate | Intermediate Depressurize | Feed gas Product gas | Repressurize Product gas | 23, 27, 34, 43 48 |
| 7 | Eq. Press. (repress.) | Vacuum Regenerate | Eq. Press. (depress.) | Feed gas Product gas | 22, 26, 28, 30 38, 44, 46 |
| 8 | Repressurize Product gas | Vacuum Regenerate | Intermediate Depressurize | Feed gas Product gas | 26, 30, 35, 39 46 |

Feed gas Product gas  Feed gas admitted to bottom of bed. Product gas released from top of bed.
Eq. Press. (depress.)  Bed pressure equalized to another bed at lower pressure through top and bottom ends of beds.
Intermediate Depressurize  Bed depressurized from intermediate location and intermediate gas collected in buffer vessel, compressed, and recycled to feed gas.
Vacuum Regenerate  Bed opened to vacuum pump through bottom end of bed.
Eq. Press. (repress.)  Bed pressure equalized to another bed at higher pressure through top and bottom ends of beds.
Repressurize Product gas  Repressurization of bed to adsorption pressure by backfill with product gas through top of bed.

At the start of the pressure swing adsorption cycle, bed A1/A2 is in the argon production step. Feed mixture from feed conduit 19 is passed to the inlet end of bed A1 via open stop valve 21. The feed mixture is adsorbed in adsorption bed A1/A2 to selectively sieve carbon monoxide, carbon dioxide and all or most of the nitrogen to produce an argon-rich fraction. Product gas, enriched in argon and having a predetermined purity, is withdrawn from the outlet end of bed A2 via open stop valve 37 and passed to the argon product pressure control valve PCV1 for further purification in argon cryogenic fractional distillation column G (see FIG. 1). The product gas enriched in argon typically contains between about 70% and about 95% of the argon in the feed mixture admixed with essentially all of the hydrogen and oxygen in the feed mixture and up to about 40% of the nitrogen in the feed mixture.

When the carbon monoxide and carbon dioxide in the feed mixture advance close to the product end of bed A2, the argon production step in bed A1/A2 is stopped. If all nitrogen must be removed in the pressure swing adsorption system, the argon production step is stopped when nitrogen advances to the product end of bed A2. Stop valves 21 and 37 are closed stopping the production of argon. Bed A1/A2 is then depressurized and bed C1/C2 is repressurized by pressure equalization of the beds. Stop valves 22 and 28 are opened and lean gas is passed from the inlet end of bed A1 to the inlet end of bed C1. At the same time, stop valves 38 and 44 are opened and lean gas is passed from the outlet end of bed A2 to the outlet end of bed C2 to substantially equalize the pressure of bed A1/A2 and bed C1/C2. Optionally, bed A1/A2 may be pressure equalized with an equalization tank through the argon enriched product end to minimize loss of void gas. The gas collected in the equalization tank is subsequently used to repressurize a bed in the pressure swing adsorption system.

When the pressure equalization step is complete, bed A1/A2 is further depressurized by an intermediate depressurization step. Stop valves 22, 28, 38, and 44 are closed and stop valve 33 is opened to withdraw a secondary product recycle stream from an intermediate position in bed A1/A2. The secondary product recycle stream is drawn at an intermediate pressure, for example at about 25 psia, and passed to secondary product surge tank L. The secondary recycle product from secondary product surge tank L is then passed to feed conduit 20 to be mixed with fresh feed mixture in feed conduits 18 and 19. The mixed feed mixture is compressed to the pressure swing adsorption operating pressure in compressor C and recycled to the pressure swing adsorption system.

After the intermediate depressurization step, bed A1/A2 is regenerated. Stop valve 33 is closed and stop valve 23 is opened. Bed A1/A2 is evacuated to the desorption pressure with vacuum pump J. In general, the desorption pressure is from about 75 torr to about 350 torr, preferably from about 75 torr to about 200 torr. Optionally, argon enriched gas from producing bed C1/C2 may be passed as a product purge through the outlet end of bed A1 via stop valve 39 during evacuation. Regeneration may also be carried out at a pressure slightly above atmospheric pressure in conjunction with purge using a portion of the argon-rich product or purge gas from an external source.

After the regeneration step, bed A1/A2 is repressurized and bed C1/C2 is depressurized by pressure equalization of the beds. Stop valve 23 is closed and stop valves 22 and 28 are opened. Void gas is passed from the inlet end of bed C1 to the inlet end of bed A1. At the same time, stop valves 38 and 44 are opened and void gas is passed from the outlet end of bed C2 to the outlet end of bed A2 to substantially equalize the pressure of bed A1/A2 and bed C1/C2.

After the repressurization step, bed A1/A2 is backfilled with argon product gas. Stop valves 22, 28, 38, and 44 are closed and bed A1/A2 is repressurized by backfill with product gas. Product gas from producing bed D1/D2 is passed through repressurization flow control valve FCV1 and into the outlet end of bed A2 to backfill bed A1/A2 through stop valve 39.

When the backfill step is complete, bed A1/A2 again produces argon. Repressurization flow control valve FCV1 is closed and stop valves 21 and 37 are opened to admit feed mixture from compressor C to the inlet end of bed A1. The argon production step in bed A1/A2 is begun and the cycle is repeated. Beds A1/A2, B1/B2, C1/C2, and D1/D2 operate in the sequence set out in Table 1. In general, the time to complete a cycle (cycle time) is in the range from about 60 seconds to about 1500 seconds, preferably from about 240 seconds to about 960 seconds, and more preferably from about 480 seconds to about 720 seconds.

Figure 3:
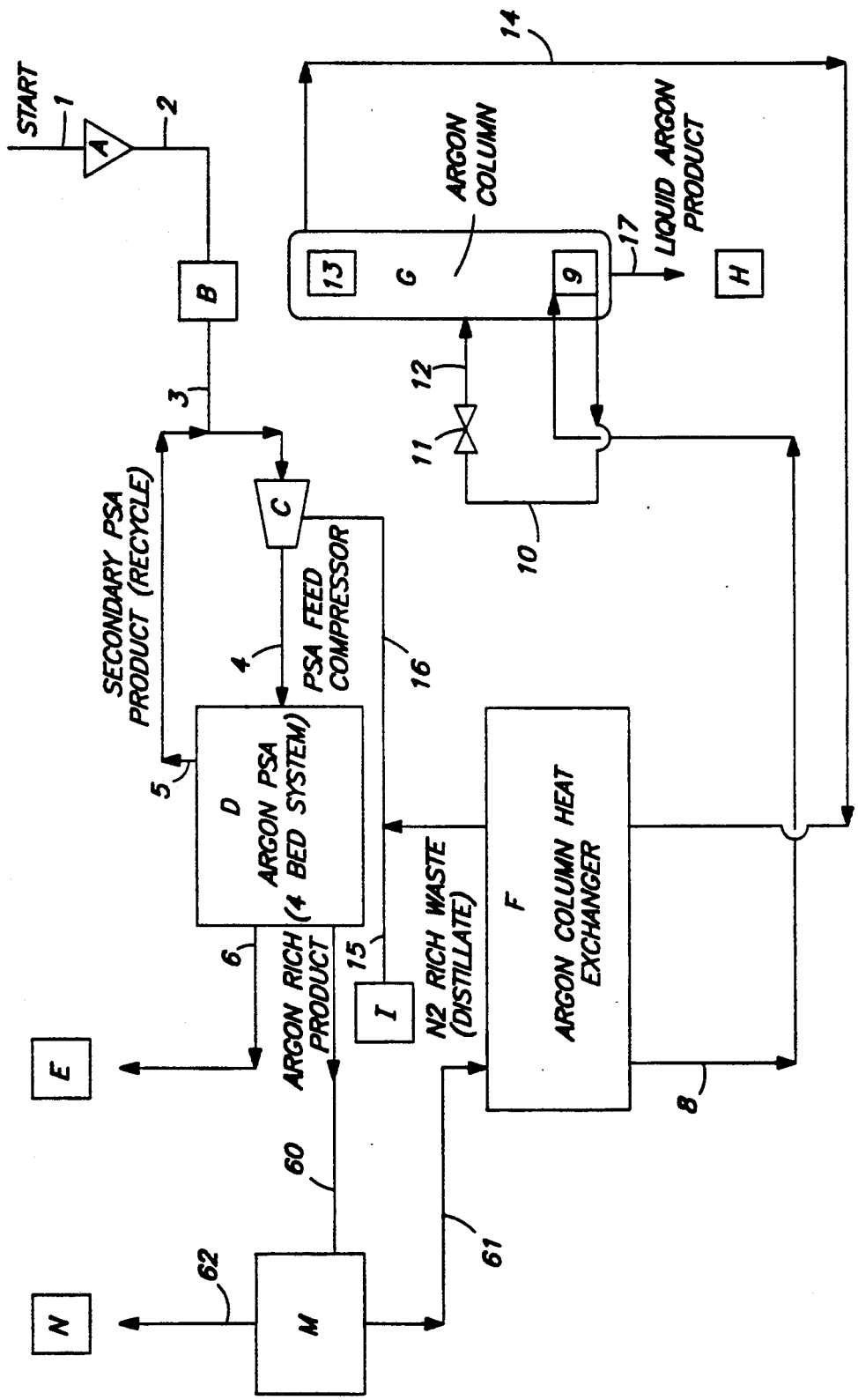
FIG. 3 is a schematic process flow diagram illustrating a second embodiment of the present invention which utilizes two pressure swing adsorption systems and a cryogenic fractional distillation system to recover argon from a feed mixture comprising argon, carbon monoxide, carbon dioxide, nitrogen, and oxygen.

FIG. 3 illustrates a second embodiment of the present invention for recovering argon from a feed mixture comprising AOD process waste gases in a full combustion mode. The feed mixture, which comprises argon, carbon monoxide, carbon dioxide, nitrogen, and oxygen, is separated by a combination of non-cryogenic and cryogenic means. In the second embodiment, after the feed mixture is passed to the first (argon) pressure swing adsorption system D to produce a first argon-rich fraction (see first embodiment, FIG. 1), oxygen is separated from the fraction by passing the fraction to a second (oxygen) pressure swing adsorption system M to produce a second argon-rich fraction.

In FIG. 3, first argon-rich fraction from first (argon) pressure swing adsorption system D (see FIG. 1) is fed through feed conduit 60 to second (oxygen) pressure swing adsorption system M to separate oxygen as an adsorbed product and to produce a second argon-rich fraction as a non-adsorbed product. The second argon-rich non-adsorbed fraction is then passed to argon column heat exchanger F via feed conduit 61 for subsequent purification in argon cryogenic fractional distillation column G. Low pressure oxygen-rich waste gas is passed from pressure swing adsorption system M to oxygen reservoir N via feed conduit 62.

Figure 4:
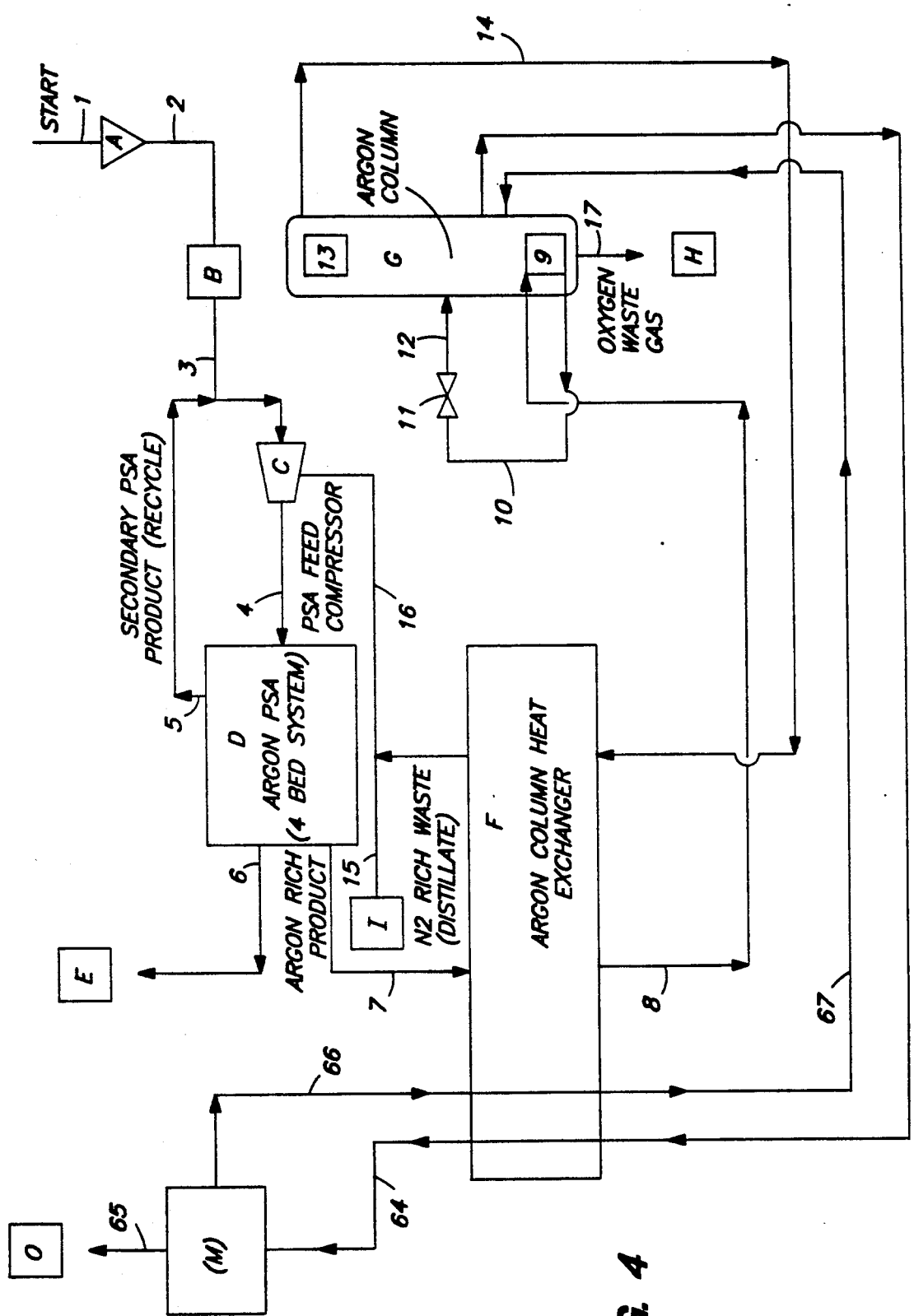
FIG. 4 is a schematic process flow diagram illustrating a third embodiment of the present invention which utilizes two pressure swing adsorption systems and a cryogenic fractional distillation system to recover argon from a feed mixture comprising argon, carbon monoxide, carbon dioxide, nitrogen, and oxygen.

FIG. 4 illustrates a third embodiment of the present invention for recovering argon from a feed mixture comprising AOD process waste gases in a full combustion mode. The feed mixture comprises argon, carbon monoxide, carbon dioxide, nitrogen, and oxygen, and is separated by a combination of non-cryogenic and cryogenic means. In the third embodiment, after the feed mixture is passed to first (argon) pressure swing adsorption system D to produce a first argon-rich fraction and argon cryogenic fractional distillation column G to produce a second argon-rich fraction (see first embodiment, FIG. 1), oxygen is separated from the fraction by passing the fraction to a second (oxygen) pressure swing adsorption system M.

In FIG. 4, second argon-rich fraction is fed from argon cryogenic fractional distillation column G (see FIG. 1) through feed conduit 63 to argon column heat exchanger F where the feed mixture is cooled to close to its liquefaction point. The warmed second argon-rich fraction is then passed from argon column heat exchanger F via feed conduit 64 to second (oxygen) pressure swing adsorption system M to separate oxygen as an adsorbed product and to produce a pure (second) argon-rich fraction as a non-adsorbed product. The pure argon product is then passed to argon reservoir O via feed conduit 65. Oxygen-rich recycle gas is passed from pressure swing adsorption system M to argon column heat exchanger F via feed conduit 66 for recycle to argon cryogenic fractional distillation column G via feed conduit 67.

In alternative embodiments, the feed mixtures in the above embodiments may be passed to a carbon dioxide separation means prior to passing the feed mixture to the first pressure swing adsorption which separates carbon monoxide, carbon dioxide, and all or most of the nitrogen from the mixture as adsorbed products and a first argon-rich fraction as a non-adsorbed product. The carbon dioxide separation means may be a carbon dioxide absorption column or a pressure swing adsorption system. The carbon dioxide absorption column may contain an absorption solution such as monoethanolamine (or other amine solution), ethylene glycol (Selexol process), potassium carbonate (Benfield process), and refrigerated methanol (Rectisol process). The molecular sieve material in the carbon dioxide pressure swing adsorption unit must have a greater selectivity for carbon dioxide than for argon. Suitable adsorbent materials to adsorb carbon dioxide include activated carbon, silica gel, type 13x zeolite molecular sieves. In a preferred embodiment, the carbon dioxide separation means is a pressure swing adsorption system.

A nitrogen refrigeration loop (refrigeration circuit, refrigeration cycle) is typically employed to extract refrigeration from the reboiler and provide refrigeration to the column condenser. The cryogenic column requires refrigeration to condense a portion of the distillate product as a reflux stream. Refrigeration is also required to liquefy the argon product in the cryogenic column condenser. Refrigeration is available at the reboiler of the cryogenic column but at higher temperatures compared to the corresponding column condenser condition.

Figure 5:
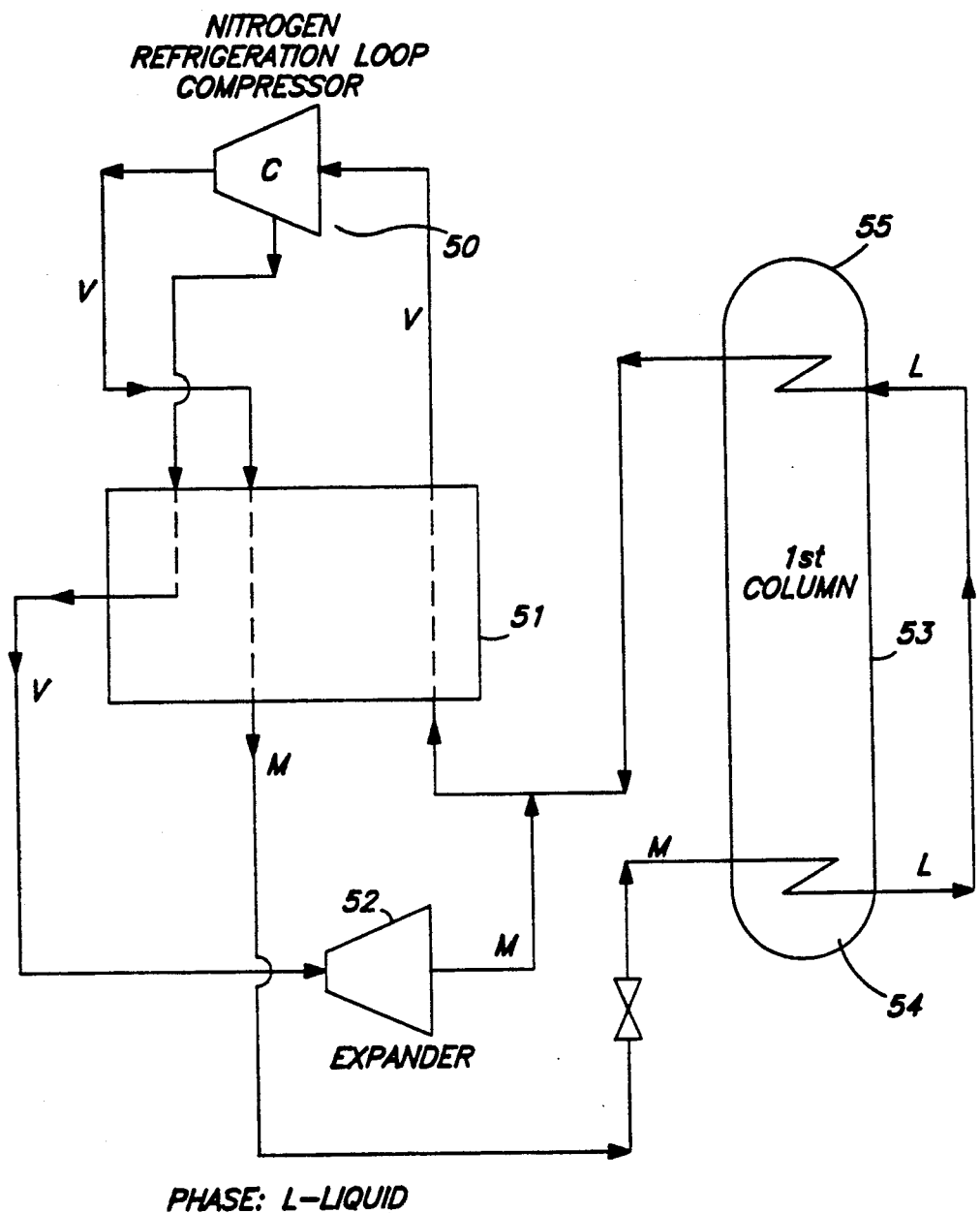
FIG. 5 is a schematic process flow diagram illustrating a refrigeration loop which may be employed with the cryogenic distillation columns in the present invention.

FIG. 5 illustrates a typical refrigeration loop. Many variations of the refrigeration loop (circuit) are possible and the selection of a specific loop depends on the particular separation process for a given feed mixture. The nitrogen refrigeration circuit works as a heat pump to extract refrigeration at a warmer temperature from the column reboiler and to supply refrigeration to the column condenser at a colder temperature. Nitrogen is the preferred refrigeration fluid for the operating temperatures in the process. The flow rate of nitrogen for recirculation is based on the refrigeration required at the column condenser.

In FIG. 5, recirculating nitrogen is compressed in compressor 50 to a high pressure. Typically, this pressure must exceed the pressure corresponding to the boiling point of nitrogen at the temperature of the reboiler. The compressed nitrogen is cooled by heat exchange with outgoing cold product streams in heat exchanger 51. The compressed fraction may optionally be expanded in expansion valve. The compressed nitrogen fraction then enters column reboiler 54 in cryogenic column 53 and is completely condensed.

The liquid nitrogen fraction leaving reboiler 54 is optionally expanded to sub-cool the fraction. The liquid fraction is then passed to column condenser 55 in cryogenic column 53. The liquid nitrogen fraction is expanded and vaporized in column condenser 55 to provide refrigeration to generate reflux. The vaporized nitrogen fraction is optionally passed through a sub-cooler to cool the liquid stream entering the condenser. The vapor stream is then heat exchanged in heat exchanger 51 to cool the high pressure nitrogen from the discharge of the refrigeration cycle compressor.

When the refrigeration required at the column condenser significantly exceeds the energy available at the reboiler, additional liquid must be made by expanding a portion of the high pressure nitrogen stream. This portion is taken from the discharge of a multi-stage refrigeration cycle compressor or from the discharge of an intermediate stage in the refrigeration cycle compressor, cooled in the heat exchanger, and then expanded in a turbine 52 to generate significant refrigeration which is transferred to the high pressure nitrogen stream from the compressor discharge. The expander discharge stream is mixed with the vaporized stream returning from the column condenser. The work generated in the expander may also be recovered by using the expander to compress a gas stream. The expander and compressor would then share a common shaft. For example, the refrigeration cycle compressor will discharge at a certain pressure and the compressor attached to the expander will compress it further.

The selectivity of the adsorbent material in the bed of the pressure swing adsorption system for a gaseous component is generally governed by the volume of the pore size and the distribution of that pore size in the adsorbent. Gaseous molecules with a kinetic diameter less than, or equal to, the pore size of the adsorbent are adsorbed and retained in the adsorbent while gaseous molecules with a diameter larger than the pore size of the adsorbent pass through the adsorbent. The adsorbent thus sieves the gaseous molecules according to their molecular size, The adsorbent may also separate molecules according to their different rates of diffusion in the pores of the adsorbent.

Zeolite molecular sieve adsorbents adsorb gaseous molecules with some dependence upon crystalline size. In general, adsorption into zeolite is fast and equilibrium is reached typically in a few seconds. The sieving action of zeolite is generally dependent upon the difference in the equilibrium adsorption of the different components of the gaseous mixture. When air is separated by a zeolite adsorbent, nitrogen is preferentially adsorbed over oxygen and the pressure swing adsorption method may be employed to produce an oxygen enriched product. When argon and carbon dioxide are separated by a zeolite adsorbent, carbon dioxide is the adsorbed component and argon is the unadsorbed component.

The molecular sieve or activated carbon adsorbent material in the first (argon) pressure swing adsorption unit must have a greater selectivity for carbon dioxide, carbon monoxide, and nitrogen than for argon. Both calcium and sodium aluminosilicate zeolites may be employed. Silica gels and silica molecular sieves are also useful. Suitable zeolite sieves include, but are not limited to, the 5A, 10X, 13X, and mordenites. Preferred zeolite sieves are the 5A medical grade zeolite sieve, commercially available from Union Oil Products, Inc. (UOP), and molecular sieves with comparable pore size and molecular attraction. The 5A medical grade zeolite sieve provides excellent selectivity for argon compared to carbon monoxide and carbon dioxide and is able to remove virtually all of the carbon dioxide and carbon monoxide yielding a product gas containing levels of only fractional parts per million (ppm) of carbon dioxide and carbon monoxide. Removal of carbon dioxide from the product gas in the pressure swing adsorption step is important. Any carbon dioxide in the argon-rich product gas will solidify when cooled to cryogenic separation temperatures. The carbon dioxide must be removed to a level of less than about 1 ppm. A carbon monoxide level equal to or less than about 20 ppm is typically required in the product. Preferably, the carbon monoxide level is about 1 ppm or less, and more preferably about 0.5 ppm or less.

In the second (oxygen) pressure swing adsorption unit, oxygen is adsorbed and removed from argon using the difference in the diffusion rates of the gases in carbon molecular sieves (CMS). Although carbon molecular sieves have similar equilibrium adsorption capacity for oxygen and argon, oxygen diffuses into the sieves faster and is removed as a strongly adsorbed component based upon kinetic selectivity.

By varying the product to feed ratio, either by changing the rate of product flow or cycle time, the argon yield at various operating pressures, corresponding to zero carbon dioxide and carbon monoxide concentration in the product, can be determined by gas chromatographic analysis of the pressure swing adsorption product stream. Argon yield is moderately reduced with increasing pressure beyond 100 psia. The variation of argon yield with pressure shows that the separation of carbon dioxide and carbon monoxide from argon is controlled by the efficiency of the regeneration step. The higher the amount of carbon dioxide and carbon monoxide removed during pressure swing adsorption bed regeneration, the higher will be the argon-carbon dioxide and argon-carbon monoxide selectivity.

During pressure swing adsorption separation, carbon monoxide, carbon dioxide and all or most of the nitrogen are removed from the feed mixture as vent gas. A certain amount of argon is lost with the vent gas. This loss of argon results from argon adsorbed in the sieves at the pressure swing adsorption operation pressure, and argon present in the bed voids and discharged during the depressurization step.

Although a particular pressure swing adsorption cycle sequence was illustrated as a preferred embodiment (Table 1), other variations of pressure swing adsorption process cycle sequences may be employed. A simple pressure swing adsorption process cycle sequence may consist of the following steps: (i) adsorption wherein feed mixture enters the bottom of bed A1 and the argon-rich gas fraction exits the top of bed A2, (ii) bed pressure equalization through the top and bottom ends of the bed to depressurize the bed, (iii) countercurrent vent, (iv) vacuum regeneration to remove components strongly adsorbed in the bed, (v) bed pressure equalization to partially repressurize the regenerated bed, and (vi) repressurization using a product backfill. This simple sequence will result in an argon yield (ratio of the quantity of argon present in the argon enriched product to the quantity of argon present in the feed mixture) of about 70%.

The process cycle sequence illustrated in Table 1 can increase the argon yield to approximately 85%. The secondary product recycle step incorporated in the process sequence referred to in Table 1 reduces argon loss by permitting the withdrawal of substantial amounts of argon containing bed void gas and gas weakly bound to the adsorbent for recycle to the pressure swing adsorption process feed mixture. The selection of an intermediate location for withdrawing the secondary product increases the amount of secondary product withdrawn without affecting the primary argon enriched product purity. If the secondary product is withdrawn from the top of the adsorption bed, then the quantity of the product withdrawn, without affecting product purity, will be limited and the net argon recovery that can be achieved will only be between about 75% and about 80%. When the secondary product is withdrawn from an intermediate position in the bed, the beds need not be separate vessels (bed A1 and bed A2, for example) but may be two regions inside a single vessel between which a side port is located for withdrawing the secondary product.

The argon yield may be improved to 90% or greater by including a cocurrent purge during the secondary product production step. In this variation of the cycle, a portion of the carbon dioxide and carbon monoxide-rich fraction is compressed and fed as cocurrent purge gas to the bottom end of the adsorption bed (inlet of bed A1, for example) during the secondary product production from the position between the two adsorption regions (between bed A1 and bed A2, for example). The cocurrent purge, also referred as sweep or displacement gas, displaces the argon near the feed end of the adsorption bed (feed end of bed A1, for example) further along and permits removal of more argon with the secondary product.

In yet another process cycle variation, the secondary production step is split into two parts. In the first part, the top region (bed A2, for example) is opened to the secondary product line while cocurrent purge gas is admitted to the lower region (bed A1, for example). In the second part, the top region is isolated and the bottom region is opened to the secondary product line. To conduct this process cycle variation, two additional stop valves must be provided to isolate the two regions from each other and from the secondary product line.

In a preferred embodiment, the pressure swing adsorption separation comprises the step of recycling a secondary depressurization product from the bed in the pressure swing adsorption system into the feed mixture passing to the pressure swing adsorption system. In another preferred embodiment, the secondary depressurization product from the pressure swing adsorption system is withdrawn from the product end of the bed in the pressure swing adsorption system. In another preferred embodiment, the secondary depressurization product from the pressure swing adsorption system is withdrawn from an intermediate location in the bed in the pressure swing adsorption system.

The secondary product withdrawal location is preferably as close as possible to the product end of the adsorption bed. The volume of bed A2, for example, must be as small as possible compared to the volume of bed A1. The volume of A2 must, however, be large enough so that the argon enriched product purity is not affected as a result of secondary product production. During the production cycle, concentration fronts are formed for each of the components in the feed. Components that are strongly adsorbed (e.g. carbon dioxide) exist at feed concentration in the gas phase near the entrance of the bed. Over a length equal to the equilibrium saturation zone, the gas phase concentration is constant. Beyond this length the concentration decreases sharply. In the present separation (carbon monoxide, carbon dioxide, and nitrogen from the feed mixture), the production of argon-rich primary product must be stopped when the equilibrium carbon dioxide front is well within the pressure swing adsorption bed since only a fractional ppm level carbon dioxide in the primary product can be tolerated. The product end of a pressure swing adsorption bed at the completion of the production step thus contains predominant amounts of argon which mainly accounts for the argon losses with the vent. It is desirable to collect a secondary product in a direction cocurrent to feed by moderate pressure reduction of the pressure swing adsorption beds before countercurrent vent or evacuation is initiated. The secondary product contains a significant amount of argon along with nitrogen and only a small amount of carbon dioxide and carbon monoxide. The quantity of this product is only about 10-25% of the feed mixture flow rate.

When a small quantity of secondary product, for example 5-10% of feed, is collected and recycled, it is preferable to withdraw the secondary product stream from the top of the bed. If greater than 10% of the feed is collected for recycle, the secondary stream should be withdrawn from an intermediate location on the bed. This method prevents contamination of the high pressure argon-rich product.

The pressure swing adsorption unit must be regenerated periodically. Suitable modes of regeneration include (i) regeneration at or below 25 psia coupled with product purge or purge from an external source, and (ii) vacuum regeneration. The nitrogen-rich distillate stream from the cryogenic separation step can be effectively used as an external purge gas.

The reflux for the cryogenic fractional distillation system may optionally be provided by liquid nitrogen produced in a recirculating refrigeration loop with the column reboiler acting as the heat sink for a heat pump. Alternatively, imported liquid nitrogen can be stored in tanks and circulated in metered amounts to provide the reflux. The nitrogen vapor can be used as an inerting agent in the steel plant.

Throughout this application, various publications have been referenced. The disclosures in these publications are incorporated herein by reference in order to more fully describe the state of the art.

The embodiments described herein are merely exemplary and a person skilled in the art may make many variations and modifications without departing from the spirit and scope of the invention. All such modifications and variations are intended to be included within the scope of the invention as defined in the appended claims.

We claim:

1. A method for recovering argon from a feed mixture comprising argon, carbon monoxide, carbon dioxide, nitrogen, and hydrogen which comprises the steps of:
   (a) purifying the feed mixture to remove contaminants;
   (b) compressing the purified feed mixture to a separation pressure;
   (c) passing the compressed purified feed mixture through a pressure swing adsorption system containing a bed of adsorbent selected from the group consisting of molecular sieves and activated carbon, thereby adsorbing carbon monoxide, carbon dioxide, and all or most of the nitrogen from the mixture and producing an argon-rich fraction as a non-adsorbed product;
   (d) removing a secondary depressurization product from the system and recycling it to the feed mixture;
   (e) desorbing carbon monoxide, carbon dioxide and nitrogen from the adsorbent under vacuum; and
   (f) passing the argon-rich fraction from step (c) to a cryogenic distillation system to separate hydrogen and any remaining nitrogen from the fraction as a distillate product and to produce a high purity argon product.

2. The method according to claim 1, wherein the argon-rich fraction withdrawn from the pressure swing adsorption system from step (c) is cooled by a heat exchanger with process waste gas leaving the cryogenic fractional distillation system prior to passing the argon-rich fraction to the cryogenic fractional distillation system.

3. The method according to claim 1, further comprising the step of recirculating a refrigerant in the cryogenic fractional distillation system in a refrigerating heat pump cycle by using a column reboiler in the cryogenic fractional distillation system as a heat sink for the refrigerating cycle to provide refrigeration at a column condenser.

4. The method according to claim 1, wherein the pure argon product contains greater than about 99% argon.

5. A method for recovering argon from a feed mixture comprising argon, carbon monoxide, carbon dioxide, nitrogen, and oxygen, which comprises the steps of:
   (a) purifying the feed mixture to remove contaminants;
   (b) compressing the purified feed mixture to a separation pressure;
   (c) passing the compressed purified feed mixture through a first pressure swing adsorption system containing a bed of adsorbent selected from the group consisting of molecular sieves and activated carbon, thereby adsorbing carbon monoxide, carbon dioxide, and all or most of the nitrogen from the mixture and producing a first argon-rich fraction as a non-adsorbed product;
   (d) removing a secondary depressurization product from the system and recycling it to the feed mixture;
   (e) desorbing carbon monoxide, carbon dioxide and nitrogen from the adsorbent under vacuum;
   (f) passing the first argon-rich fraction from step (c) to a second pressure swing adsorption system to separate oxygen as an adsorbed product and to produce a second argon-rich fraction as a non-adsorbed product; and
   (g) passing the second argon-rich fraction from step (f) to a cryogenic fractional distillation system to separate any remaining nitrogen from the fraction as a distillate product and to produce a high purity argon product.

6. The method according to claim 5, wherein the feed mixture comprises argon in an amount greater than about 10%, carbon monoxide in an amount up to about 40%, carbon dioxide in an amount up to about 40%, nitrogen in an amount up to about 40%, and oxygen in an amount up to about 20%.

7. The method according to claim 5, wherein said adsorbent is an aluminosilicate zeolite selected from the group consisting of 5A, 10X, 13X, and mordenites.

8. The method according to claim 5, further comprising the step of passing vent gas from the first pressure swing adsorption system from step (c) to an equalization tank to minimize loss of void gas.

9. The method according to claim 5, wherein adsorbent material in the first pressure swing adsorption system from step (c) undergoes periodic regeneration with a purge gas.

10. The method according to claim 5, further comprising the step of backfilling the first pressure swing adsorption system from step (c) with product gas to repressurize the pressure swing adsorption system to increase the purity of the first argon-rich fraction.

11. The method according to claim 5, wherein the first argon-rich fraction withdrawn from the first pressure swing adsorption system from step (c) is cooled by a heat exchanger with process waste gas leaving the cryogenic fractional distillation system prior to passing the first argon-rich fraction to the cryogenic fractional distillation system.

12. The method according to claim 5, further comprising the step of recirculating a refrigerant in the cryogenic fractional distillation system in a refrigerating heat pump cycle by using a column reboiler in the cryogenic fractional distillation system as a heat sink for the refrigerating cycle to provide refrigeration at a column condenser.

13. The method according to claim 5, wherein the pure argon product contains greater than about 99% argon.

14. The method according to claim 5, wherein the purified feed mixture from step (a) is passed to a carbon dioxide separation means prior to compressing the mixture in step (b).

15. The method according to claim 14, wherein the carbon dioxide separation means is a carbon dioxide absorbent column.

16. The method according to claim 14, wherein the carbon dioxide separation means is a pressure swing adsorption system.

17. The method according to claim 5, wherein the second pressure swing adsorption separation in step (d) is carried out before the first pressure swing adsorption separation in step (c).

18. A method for recovering argon from a feed mixture comprising argon, carbon monoxide, carbon dioxide, nitrogen, and oxygen, which comprises the steps of:
   (a) purifying the feed mixture to remove contaminants;
   (b) compressing the purified feed mixture to a separation pressure;
   (c) passing the compressed purified feed mixture through a first pressure swing adsorption system containing a bed of adsorbent selected from the group consisting of molecular sieves and activated carbon, thereby adsorbing carbon monoxide, carbon dioxide, and all or most of the nitrogen from the mixture and producing a first argon-rich fraction as a non-adsorbed product;
   (d) removing a secondary depressurization product from the system and recycling it to the feed mixture;
   (e) desorbing carbon monoxide, carbon dioxide and nitrogen from the adsorbent under vacuum;
   (f) passing the first argon-rich fraction from step (c) to a cryogenic fractional distillation system to separate any remaining nitrogen from the fraction as a distillate product and to produce a second argon-rich fraction; and
   (g) passing the second argon-rich fraction from step (f) to a second pressure swing adsorption system to separate oxygen as an adsorbed product and high purity argon as a non-adsorbed product.

19. The method according to claim 18, wherein the feed mixture comprises argon in an amount greater than about 10%, carbon monoxide in an amount up to about 40%, carbon dioxide in an amount up to about 40%, nitrogen in an amount up to about 40%, and oxygen in an amount up to about 20%.

20. The method according to claim 18, wherein said adsorbent is an aluminosilicate zeolite selected from the group consisting of 5A, 10X, 13X, and mordenites.

21. The method according to claim 18, further comprising the step of passing vent gas from the first pressure swing adsorption system from step (c) to an equalization tank to minimize loss of void gas.

22. The method according to claim 18, wherein adsorbent material in the first pressure swing adsorption system from step (c) undergoes periodic regeneration with a purge gas.

23. The method according to claim 18, further comprising the step of backfilling the first pressure swing adsorption system from step (c) with product gas to repressurize the pressure swing adsorption system to increase the purity of the first argon-rich fraction.

24. The method according to claim 18, wherein the first argon-rich fraction withdrawn from the first pressure swing adsorption system from step (c) is cooled by a heat exchanger with process waste gas leaving the cryogenic fractional distillation system prior to passing the first argon-rich fraction to the cryogenic fractional distillation system.

25. The method according to claim 18, further comprising the step of recirculating a refrigerant in the cryogenic fractional distillation system in a refrigerating heat pump cycle by using a column reboiler in the cryogenic fractional distillation system as a heat sink for the refrigerating cycle to provide refrigeration at a column condenser.

26. The method according to claim 18, wherein the pure argon product contains greater than about 99% argon.

27. The method according to claim 18, wherein the purified feed mixture from step (a) is passed to a carbon dioxide separation means prior to compressing the mixture in step (b).

28. The method according to claim 27, wherein the carbon dioxide separation means is a carbon dioxide adsorption column.

29. The method according to claim 27, wherein the carbon dioxide separation means is a pressure swing adsorption system.

* * * * *